United States Patent Office 3,061,918
Patented Nov. 6, 1962

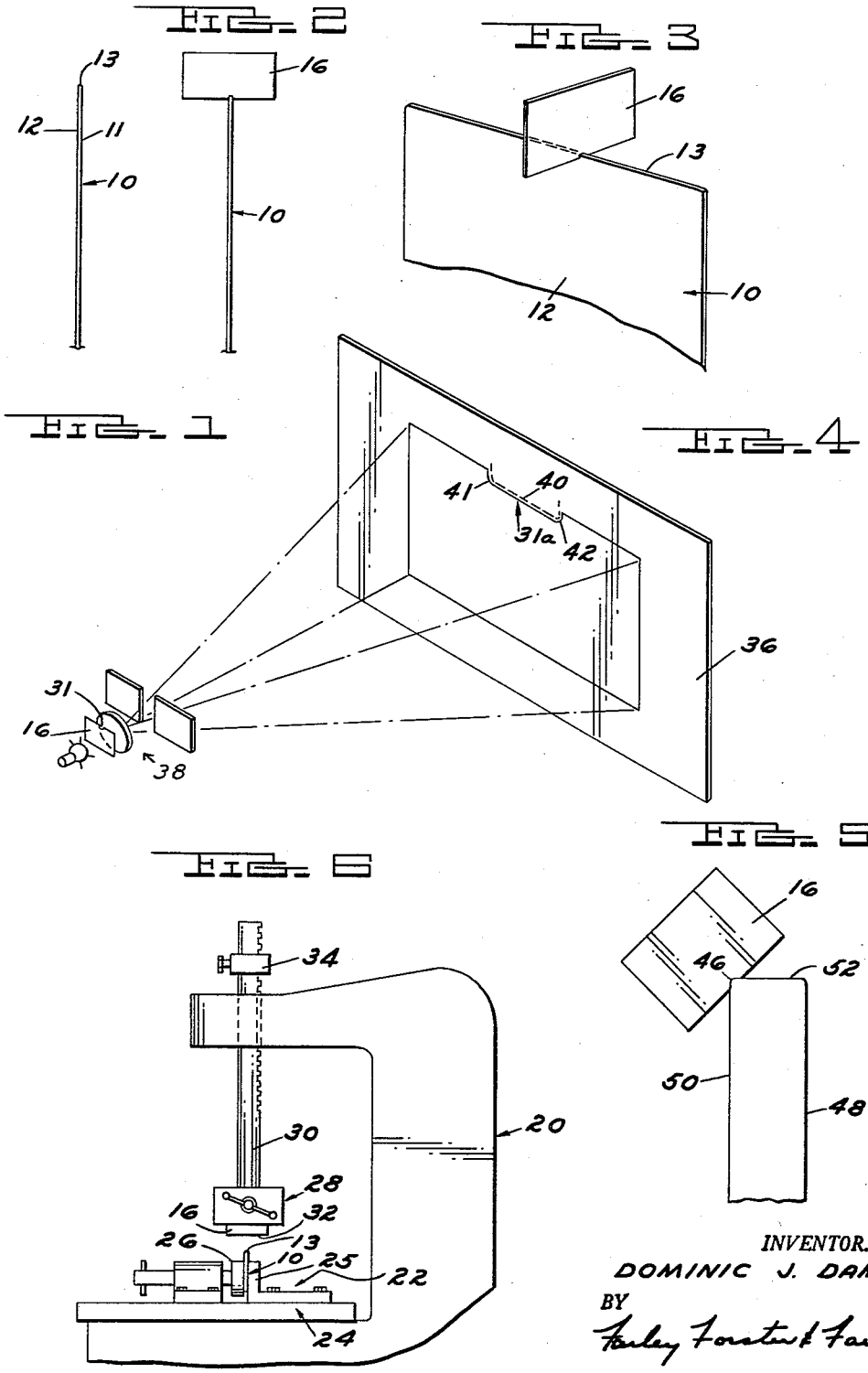

3,061,918
METHOD AND APPARATUS FOR ACCURATE-
LY MEASURING EDGE CONTOUR OF AN
ARTICLE
Dominic J. Damm, Detroit, Mich., assignor to Detroit
Stamping Company, Detroit, Mich., a corporation of
Michigan
Filed Oct. 30, 1959, Ser. No. 849,909
4 Claims. (Cl. 29—407)

This invention relates to a method of checking a contour formed along an edge of an article where two angularly related surfaces intersect each other, particularly a contour of very small radius such as is frequently formed along such an edge, and to apparatus for putting the method into practice.

In the manufacture of many articles, the sharp edge or corner formed where two surfaces of the article intersect each other, is given a rounded contour, usually on a very small radius, and in many cases the dimension of this radius is a critical one. The present invention provides a way in which a critical dimension of this type, whether it be a radius or other type of contour, can be easily checked or measured.

As an example of the problem to which the present invention affords a solution, a representative article is a flapper valve body formed from thin sheet metal having a thickness of .014 inch. The specification for this valve body calls for the forming of a radius of .002 inch at each edge where the major surfaces of the sheet material intersect the edge surface thereof. The dimension of this radius is critical. In manufacturing the part, the radius is formed by tumbling the valve bodies. Control over the formation of the radius can obviously only be obtained by spot checking parts and measuring the radius. No completely satisfactory way of performing this measuring operation was known prior to the present invention. The usual way previously employed was to cut a section through the part and measure the radius on the section so obtained by attempting to enlarge the section with projection equipment. Not only does this method destroy the part being checked and limit the number of locations where the radius can be checked on any one part, but it is also extremely difficult to secure an accurate section due to the distortion which accompanies any machining operation by which the section may be formed. There is a further problem of projecting an accurate enlargement of the section.

The method of the invention involves the steps of taking a relatively thin sheet of a material which is softer than that of the article, low in resiliency and permanently deformable; positioning this sheet so that the plane thereof is normal to at least one of the intersecting surfaces of the article or part which defines the edge to be measured; and relatively moving the part and sheet of material so that an edge of the latter is brought into contacting engagement with the article edge contour being checked an amount sufficient to form a true impression of this contour in the edge of the sheet of material. An enlargement of this impression is then made so that the shape or radius of the contour can be readily measured.

Suitable apparatus for practicing the method includes means in which the article or part to be checked can be clamped with the edge contour to be measured, exposed; a device for clamping the sheet of soft deformable material with an edge thereof projecting from the clamping means; and means for pressing the edge of the sheet of material against the contour of the article an amount sufficient to form an impression of the contour being measured in the sheet of material.

The accompanying drawing contains several views which schematically illustrate the manner in which the method is performed and suitable apparatus for performing it. These views are identified as follows:

FIGURE 1 is an end elevation of a portion of a representative part;

FIGURE 2 is a view similar to FIGURE 1 including a sheet of material used for obtaining an impression of the contours to be measured;

FIGURE 3 is a perspective view of the part and sheet of material of FIG. 2;

FIGURE 4 is a perspective view illustrating how a measuring or checking operation is performed with an enlarged projection;

FIGURE 5 is an elevation of another part showing an impression being obtained of one of its edge contours; and FIGURE 6 is a schematic elevation of apparatus for obtaining an impression of edge contours in the manner illustrated in FIGS. 2 and 3.

Referring to these drawings, FIGURE 1 illustrates an end view of a part 10 such as the relatively thin flapper valve body previously mentioned, the specifications of which call for the accurate formation of an extremely small radius at the intersection of each of the major surfaces 11 and 12 with the edge surface 13. A part having dimensions such as mentioned before cannot be very well shown in scale and hence in the illustration the thickness is about three times actual size. Even with this degree of enlargement, some appreciation of the problem of measuring the radius at the intersection of each of the surfaces 11 and 12 with the surface 13 can be appreciated.

FIGURE 2 illustrates the step in the present method which involves taking a piece of sheet material 16 which is softer than the material of the article 10, and additionally possesses the characteristics of being permanently deformable and non-resilient, and pressing it against the article contour to be measured. As an example of such a material, we have found that soft sheet aluminum is satisfactory for the sheet 16 in a case where the article 10 is made from steel. Good results are obtained with a sheet thickness of .020 inch. If thinner, the edge tends to distort or bend; if thicker, the accuracy of enlargement is impaired.

FIGURE 3 illustrates the relation between the part 10 and sheet of material 16 when the latter is pressed against the edge 13 of the part a distance sufficient to obtain an impression of this edge, the adjacent portions of the article surfaces 11 and 12, and the contours formed at the intersections of these surfaces with the edge 13. This impression is obtained by suitable apparatus such as the press 20 schematically shown in FIGURE 6. The part 10 is mounted in a suitable clamp 22 secured to the bed 24 of the press in a position where the edge 13 projects from the clamp jaws 25 and 26 but is still supported thereby against bending.

Another suitable clamp 28 is mounted on the press plunger 30 and the sheet of material 16 is mounted between the jaws thereof with an edge 32 supported against bending by the jaws and projecting slightly therefrom. A stop 34 is mounted on the press plunger 30 so that when the plunger is moved downwardly to press the edge of the sheet 16 against the edge 13 of the part 10, the extent of this movement is limited to an amount just sufficient to form a sharp accurate impression 31 of the edge 13 in the edge 32 of the sheet without otherwise distorting either the sheet or the part.

As shown in FIGURE 4, the impression 31 thus formed in the sheet 16 can be enlarged by projecting the same on a screen 36 by suitable projection equipment 38 as schematically shown. The screen 36 may be provided with a master contour as indicated by the dotted line 40 with which the edge contours of the enlarged impression 31a can be visually compared. Alternately, the radius of each of the edge contours 41 and 42 of the enlarged impression 31a can be actually measured.

FIGURE 5 illustrates an application of the same method for checking the contour at the edge 46 of a part 48 of much greater thickness. The sheet 16 is positioned so that its plane is perpendicular to the plane of at least one of the intersecting article surfaces 50 or 52 and an impression is formed by relatively moving the part 48 and the template into contacting engagement an amount sufficient to form the impression desired.

While preferred embodiments have been described above in detail, it will be understood that numerous modifications might be resorted to without departing from the scope of the invention as defined in the following claims.

I claim:
1. A method of checking the curvature of the contour at the intersection of each of the major surfaces of an article made from sheet stock with an edge surface where such curvature is too small to be accurately measured directly on the article, consisting of the steps of taking a relatively thin sheet of a material which in its natural state is deformable, non-resilient and softer than that of the article, positioning said article in suitable clamp means so that said edge surface and adjacent portions of the major surfaces thereof are supported but exposed at the location where the curvature is to be checked, positioning said sheet of material in suitable clamp means so that an edge thereof is similarly supported but exposed and substantially parallel to said article edge surface at said location and so that the plane of said sheet is normal to the planes of said major article surfaces, relatively moving said article and sheet with sufficient force a distance such as to press the said exposed edge of said sheet against the said edge surface of said article and form a sharp accurate impression in said sheet of said article edge surface and the contours of said intersections, forming an enlargement of said impression, and checking the curvature of each contour on said enlargement.

2. Apparatus for measuring the edge contour at a selected location along the intersection of two angularly related surfaces of an article consisting of a sheet of relatively thin, deformable, non-resilient material which in its natural state is softer than that of the article to be gauged so that a sharp accurate impression of said contour can be formed in an edge of said sheet, enlarged and measured; means for clamping said article with said location on said intersection exposed from said clamping means, means for clamping said sheet with an edge thereof projecting from said sheet clamping means, means for relatively moving said article and sheet clamping means a distance sufficient to press the said projecting edge of said sheet against said article at the said intersection of the article surfaces to form an accurate impression of said curvature in the edge of said sheet, and means for enlarging said impression whereby said contour may be measured.

3. A method of checking the edge contour at the intersection of a major surface of an article made from sheet stock with an edge surface where such contour is too small to be accurately measured directly on the article, consisting of the steps of: (a) taking a relatively thin sheet of a material which in its natural state is deformable, non-resilient and softer than that of the article; (b) positioning the article in suitable clamp means so that the major surfaces thereof are supported but the said edge contour is exposed adjacent the location where it is to be checked; (c) positioning said sheet of material in suitable clamp means so that an edge thereof is similarly supported but exposed and so that said sheet is normal to the plane of said article; (d) relatively moving said article and sheet with sufficient force a distance such as to press the said exposed edge of said sheet against the said edge contour of said article and form a sharp accurate impression in said sheet of said article edge contour; (e) forming an enlargement of said impression; and (f) checking the curvature of said edge contour on said enlargement.

4. Apparatus for measuring the edge contour at the intersection of two angularly related surfaces of an article, consisting of a sheet of relatively thin, deformable, non-resilient material which in its natural state is softer than that of the article to be gauged so that a sharp accurate impression of said contour can be formed in an edge of said sheet, enlarged and measured; means for clamping said sheet with an edge thereof projecting from said clamping means and supported against bending thereby; means for positioning said article with the said edge contour thereof projecting from said positioning means and with at least one of the said article surfaces extending at right angles to the plane of said sheet; and, means for relatively moving said sheet and article to bring said edge of said sheet into engagement with said contour to be gauged thereby forming said impression.

References Cited in the file of this patent
UNITED STATES PATENTS 2,795,995  Razdow _____ June 18, 1957
2,949,674  Wexler _____ Aug. 23, 1960

OTHER REFERENCES

Young: "Microscopic Examination of Interior or Highly Curved Surfaces by Means of Replicas," Review of Scientific Instruments, vol. 29 (July 1958), page 661.